April 16, 1957  A. KRAUSZER ET AL  2,788,667
AUTO-MEMORY CLUTCH
Filed Nov. 2, 1953  3 Sheets-Sheet 1
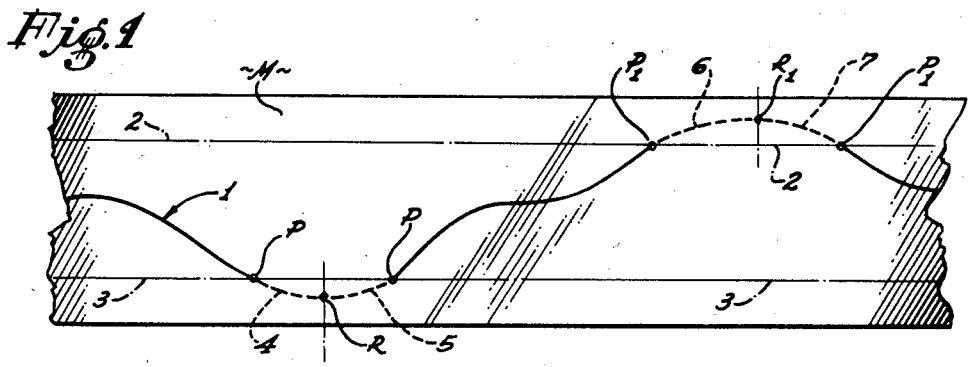
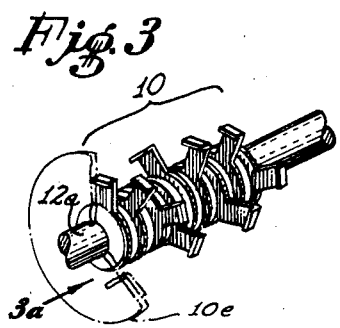
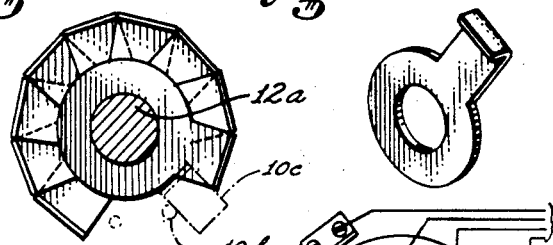
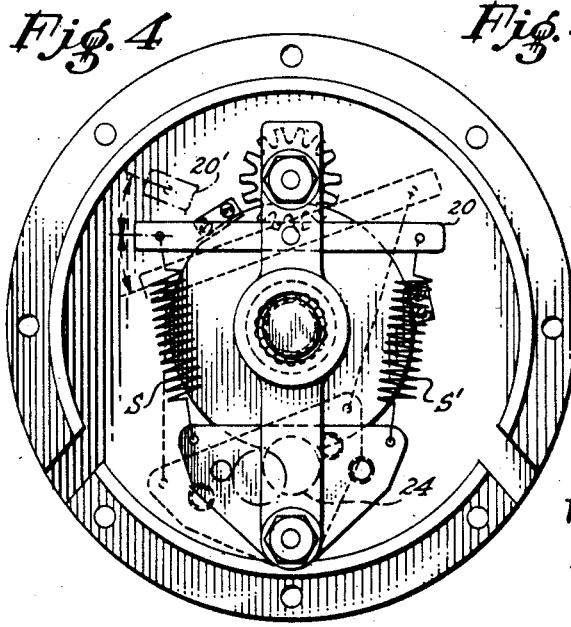
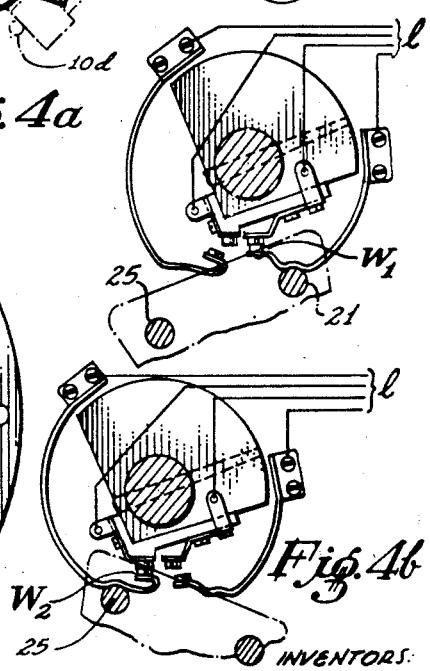
INVENTORS.
Adam Krauszer
Roland E. Gagnon
Their Patent Attorney

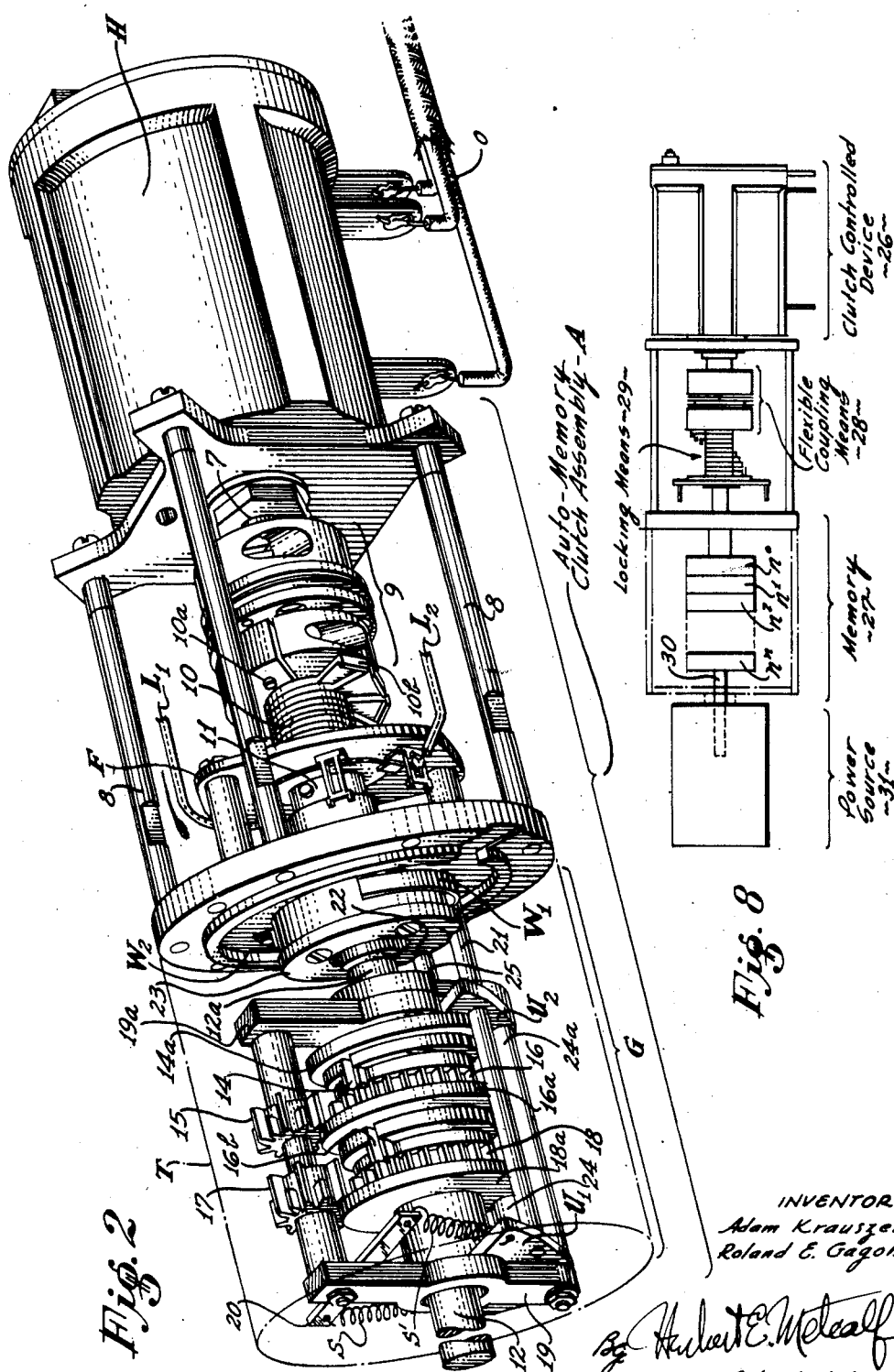

April 16, 1957 A. KRAUSZER ET AL 2,788,667
AUTO-MEMORY CLUTCH
Filed Nov. 2, 1953 3 Sheets-Sheet 3

INVENTORS:
Adam Krauszer
Roland E. Gagon

By Herbert E. Metcalf
Their Patent Attorney

United States Patent Office 2,788,667
Patented Apr. 16, 1957

2,788,667
AUTO-MEMORY CLUTCH

Adam Krauszer and Roland E. Gagon, Torrance, Calif., assignors to Northrop Aircraft, Inc., Hawthorne, Calif., a corporation of California Application November 2, 1953, Serial No. 391,822

6 Claims. (Cl. 74—1)

This invention relates to mechanical memory devices and, more particularly, to a bi-directional auto-memory clutch, capable of locating and accurately identifying the location of a fiducial point on a dynamic device.

A clutching device is often utilized as an essential component of various mechanical movements. By incorporation of a "memory" feature into a clutch, its utility can be drastically extended. A "memory" clutch, for example, can be used in conjunction with rotating components of limited operational range or as an efficient timing device. A useful application of this invention is in the extension of the limited (ten turn) rotational range of a helically wound potentiometer as, for example, of a Helipot, manufactured by Helipot Corporation of South Pasadena, California; it is with this application that the ensuing disclosure is primarily concerned.

It is, accordingly, an object of this invention to provide means for extending the rotational range of a rotary potentiometer while retaining a "memory" of the stop positions over the operational range.

Briefly, the invention comprises a combination of mechanical components including a mechanical stop which is engaged when the shaft of a rotary potentiometer reaches either extreme of range; further rotation of the shaft upon which the stop is affixed results in stretching a spring which, by lever action, causes a lock dog either to fall into or to be removed from a notch suitably positioned on a fixed spacer plate. This dog, upon locking (or unlocking), effects actuation of a switch located just behind the fixed plate. When the operational range of the rotary potentiometer is exceeded, the entire gear frame assembly is locked into position by the dog and a cam follower effects rotational engagement of a plurality of gear stages, thus permitting a series of idler gears and cams to transmit turns between memory stages.

Although construction details shown in the following drawings will be rather specifically described, it is to be understood at the outset that the present disclosure is to a large extent illustrative and exemplary rather than limiting inasmuch as many different embodiments of this invention are within the scope of skilled workers. For example, orientation of a telescope to a desired sky sector according to the output of the rotary potentiometer and storing of analog information for control actuation are typical variations in use of the invention.

Thus it is a further object of this invention to provide means for locating a fiducial point within the operational range of an adjustable device and also to provide means for accurately determining the extent by which this fiducial point has been exceeded.

It is still a further object of this invention to provide a multiple stage mechanical memory device, conveniently arranged in a stacked array.

Previously enumerated objects and features will be more fully understood and other objects will be rendered apparent by reference to the following detailed description read in conjunction with the accompanying drawings, wherein:

Figure 1 is a fragmentary plan view of a recording strip, serving to illustrate utility of the invention.

Figure 2 is a perspective view of a preferred embodiment of the invention.

Figure 3 is a perspective view of a shaft-lock configuration of an indexed washer assembly.

Figure 3a is a plan view of a shaft-lock configuration of an indexed washer assembly.

Figure 3b is a perspective view of a typical indexed washer.

Figure 4 is a detail view showing a clutch unit and the operative movements thereof.

Figures 4a and 4b are detail views illustrating action of range limit switches.

Figure 8 is a generalized block diagram showing the arrangement of the mechanisms used in the described embodiment of the invention.

Figure 5:
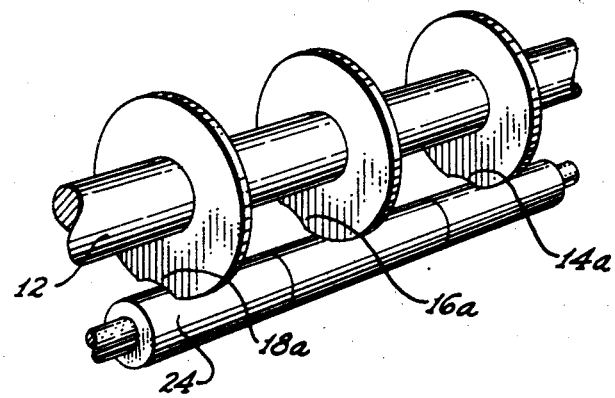
Figures 5, 6 and 7 are perspective views illustrating cam orientation after one, two and twelve revolutions, respectively, of the input shaft beyond a fiducial point.

Although uses of an auto-memory clutch are manifold, the present disclosure is directed toward a specific application—namely, the problem of accurately recording signals from a rotary potentiometer, for example, the operational range of which is subject to being exceeded. Figure 1 is illustrative of the utility of such a device; it is a plan view of a recording strip with signals recorded thereon. A recording medium M is shown having an intermittent solid line 1 recorded thereon. As used herein, these lines 1 are representative of output signals from a rotary potentiometer, the upper and lower limits of operational range of which are indicated by reference lines 2 and 3, respectively.

When the rotary potentiometer exceeds a certain fiducial point P in its lower range 3, the auto-memory clutch records excessive travel in this direction (indicated by dotted line 4) until direction reversal occurs at point R, for example; then the auto-memory clutch duplicates its previous travel but in the opposite direction (along dotted line 5) until fiducial point P is again reached; then recording commences again. Thus the auto-memory clutch serves to insure that recording commences at the same point within the lower range of the rotary potentiometer as that where recording ceased.

Similarly, when a fiducial point $P_1$ is exceeded in the upper range of rotary potentiometer operation, the auto-memory clutch stores revolutions as indicated by dotted travel line 6 until direction reversal point $R_1$ is attained, then these stored revolutions are reproduced (in the opposite direction) as indicated by dotted travel line 7 until fiducial point $P_1$ is properly located; recording then commences again.

It is to be noted that the fundamental principle of this invention lies in the accurate recollection of and location of any desired fiducial point within the operational range of a dynamic device.

In Figure 2 there is presented a perspective view of a preferred embodiment of the invention showing a ten turn rotary potentiometer H connected to auto-memory clutch assembly A via potentiometer shaft 7 and a fixed connecting frame 8. When the clutch assembly is engaged, the entire assembly A, comprising coupling assembly 9, indexed washer assembly 10, collar 11, shaft 12a, gear assembly G and shaft 12 can be rotated as a single unit. The shaft 12a is pinned to collar 11 on one end, supported by a bearing carried in spacer 23 and is press-fitted into the hub of arm 19a at the other end. The collar 11 is rigidly connected to coupling assembly 9 by a neck (shaft) rotatably carrying the washer assembly 10. However, when either operational limit of rotary potentiometer H is exceeded, only two-tooth gear 14, its accompanying cam 14a, a first secondary idler gear 15, a first multi-toothed gear 16, its accompanying cam 16a and accompanying two-toothed gear 16b, a second idler gear 17, a second multi-toothed gear 18, its accompanying cam 18a and shaft 12 rotate, the other units being locked in a stationary position owing to action of indexed washer assembly 10, cams 14a, 16a and 18a, springs S and S', rocker assembly U₁ pivoted on arm 19, rocker assembly U₂ pivoted on arm 19a and bar 20. The shaft 12 mounting gear assembly G is supported near one end by a bearing carried in the hub of arm 19 and the other (right) end of shaft 12 is supported in a bearing pressed into a hole axially bored in the end of shaft 12a. Cam 14a and two-tooth gear 14 are integral with shaft 12 while cams 16a, 18a and gears 16, 16b and 18 are rotatably mounted on bearings on shaft 12.

When either extreme of operational range of rotary potentiometer H is approached, indexed washer assembly 10 can acquire a configuration as shown in perspective view along the axis of shaft 12a in Figure 3 and attains a final configuration more clearly shown in plan view (along axis of shaft 12a) in Figure 3a, when a limit is reached. A typical stop washer is illustrated, in perspective view, in Figure 3b. A pin 10a embedded in the left half of coupling 9 as shown in Figure 2 engages with first stop washer 10b. Each revolution of coupling 9 rotates stop washer 10b one turn, stop washer 10b picking up a successive stop washer after each revolution until the spiraling fan pattern illustrated in Figure 3a is achieved. This requires ten revolutions in one direction from one extreme. A similar counter-spiraling fan pattern is secured after ten revolutions in the opposite direction. When a full spiral fan configuration is nearly achieved, for example, after 9½ turns, stop washer 10c is braced against a pin 10d embedded in disk 10e (Figure 3) which, in turn, is secured to the wiper of a two position wafer switch F secured to connecting frame 8. Switch F is switched "on" by action of disk 10e to one position after ten turns in one direction and "on" in the other position after ten turns in the opposite direction. Thus, the last half turn can be used to actuate switch F, from one "on" position to a diametrically opposite "on" position on the wafer switch F. Potentiometer shaft 7 is now locked into position; consequently continued torque in the same direction applied to shaft 12 results in cam 14a overcoming tension of spring S by producing a moment force on a nylon cam follower shaft 24 causing rocker assemblies U₁ and U₂ to rotate on their pivot shaft 24a and thus effect contact of rod 21 with recess 22 in fixed spacer plate 23 to lock the frame of gear assembly G, preventing it from revolving. This action is illustrated in Figure 4, the solid lines indicating orientation while clutch is engaged, the dotted lines indicating orientation when clutch is disengaged.

Figure 6:
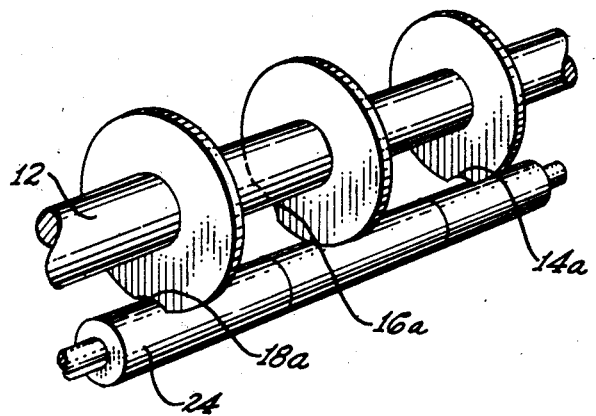
Figure 7:
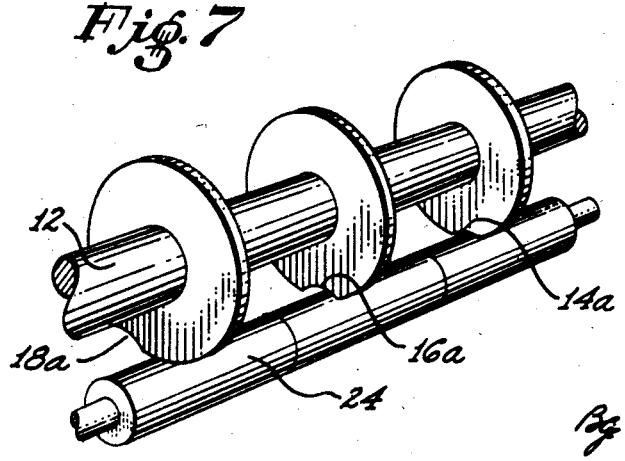

Two-tooth gear 14 is essentially a "one-turn" memory because each revolution of gear 14 advances first secondary gear 15 one notch which, in turn, advances multi-tooth gear 16 by one notch (1/12 of a revolution). Of course, cam 14a is also advanced with two-tooth gear 14; it is the action of cam 14a which prevents spring S from releasing during the first revolution of shaft 12 after clutch disengagement. On the second revolution, multi-toothed gear 16 is advanced one notch and the accompanying motion of its cam 16a maintains tension of spring S through action on shaft 24. After twelve revolutions of shaft 12, multi-toothed gear 18 is advanced one notch (1/12 of a revolution) as is its cam 18a which also serves to maintain tension of spring S. This cam action is illustrated in Figure 5 which is a diagrammatic representation of orientation of cams 14a, 16a and 18a after one revolution of shaft 12 when clutch is disengaged; Figure 6 shows orientation after two revolutions of shaft 12; Figure 7 is same representation after twelve revolutions of shaft 12. It is to be noted that beyond the operational range of rotary potentiometer H, multi-toothed gear 16 is advanced 30 degrees for each revolution of shaft 12 and multi-toothed gear 18 (and cam 18a) is advanced 30 degrees for every twelve revolutions of shaft 12; thus gear 16 is essentially a one-turn memory device and gear 18 is essentially a twelve-turn memory device. The "memory" capacity of gear assembly G is thus 12×12 or 144 turns. This action is bi-directional; consequently gear travel in one direction can be accurately reproduced in the opposite direction, thus providing an efficient memory device.

Consider now the effect of reversing the direction of rotation of shaft 12, i. e., returning toward the operational range of rotary potentiometer H. Since the spur gears 14, 15, 16, 17 and 18 are symmetrical, stepping action is accurately reproduced in the opposite direction. It is to be noted that on the final turn of shaft 12 (right before the clutch engages), recesses of cams 14a, 16a and 18a are properly aligned and the cams lock into follower shaft 24 and tension spring S is relieved. Consequently the clutch is engaged at the correct moment, i. e., when rotary potentiometer H comes into operational range; the entire unit is now free to rotate as governed by rotation of input shaft 12 since the lock dog (rod 21) is released. Thus action effected at the other extreme of rotary potentiometer range is analogous to that previously explained with the exception, of course, that approach and depart rotation directions are reversed. The bar 20 would be tilted in the opposite direction as indicated by 20' (partially shown in Figure 4) and the tension of spring S' is overcome.

Provision is included in the invention for indicating when the ten turn range of rotary potentiometer H is exceeded. Switches W₁ and W₂ effect this indication; these switches W₁ and W₂ are energized by clutch disengagement condition because of contact actuation as shown in Figures 4a and 4b by rods 21 and 25, respectively. They provide indication as to when the memory is recording by virtue of their energization status, which can be conveyed to indicating means; a red lamp and a blue lamp, for example, via leads l. Figure 4a is a plan view along axis of shaft 12 which illustrates the action of switch W₁; Figure 4b is a similar view illustrative of the action of switch W₂.

It is to be noted that this same indicating action can be provided by utilization of rotary wafer switch F (Figure 2) having output leads L₁ and L₂; these leads could be utilized for other operations, as relay actuation, for example, if so desired.

Output of rotary potentiometer H is conveyed to suitable recording means via output leads O.

Gear assembly G is enclosed in protective cover T.

In order to elucidate further applications of this invention and also to summarize general operational principles thereof, this general discussion is included in the specification. Reference is now made to Figure 8 which is a generalized block diagram of the invention, in which a clutch-controlled device 26 is linked to N-stage memory 27 via coupling means 28 and reference shaft lock means 29. Input shaft 30 is driven by power source 31. It is to be noted that any suitable power source—an electric motor, for example—would suffice to effect rotation of input shaft 30 (this shaft is similar to input shaft 12 shown in Figure 2). In accordance with the setting of reference shaft lock means 29, memory 27 can be engaged at any desired reference point in the rotation of clutch-controlled device 26. Of course, the capacity of mechanical memory 27 is dependent upon the number of gear cam stages included therein; the gears are arranged to remember rotations in the numerical sequence $n^0$, $n^1$, $n^2$, $n^3$ ... $n^n$. Operation of memory 27 is bi-directional.

Figure 8 serves to illustrate the versatility of this invention, i. e., while there is herein shown and described a preferred embodiment of the invention, it is nevertheless to be understood that minor changes may be made therein without departing from the spirit and scope of the invention as encompassed by the legitimate and valid range of the appended claims.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claims.

What is claimed is:

1. An auto-memory clutch, comprising: an input shaft adapted to be rotatably driven by input driving means; an output shaft adapted to be rotatably coupled to a rotatably driven device having a mechanically limited operational range, said output shaft positioned in extended longitudinal alignment with said input shaft; a fixed bearing plate rotatably supporting said output shaft; a first arm support affixed to a counter-bored end of said output shaft, said first arm support having two radially extended arms in opposed directions; bearing means mounted in the counter-bored end of said output shaft rotatably supporting an end of said input shaft; a first recessed circular cam affixed sequentially adjacent said first arm support on said input shaft; a first two-toothed gear sequentially affixed to said first cam on said input shaft, the recess on said first cam located 180 degrees opposite a notch defined by the two teeth on said first two-toothed gear; a first $n$-toothed gear rotatably mounted in sequence on said input shaft; a second recessed circular cam rotatably mounted in sequence on said input shaft, said second cam affixed to said first $n$-toothed gear; a second two-toothed gear rotatably mounted in sequence on said input shaft and affixed to said second cam, the recess on said second cam located 180 degrees opposite a notch defined by the two teeth on said second two-toothed gear, a second $n$-toothed gear rotatably mounted in sequence on said input shaft; a third recessed circular cam rotatably mounted in sequence on said input shaft, said third cam affixed to said second $n$-toothed gear; a second arm support rotatably mounted and affixed in sequence on said input shaft, said second arm support having two radially extended arms in opposed directions; an idler shaft connecting two ends of said first and second arm supports parallel to the axis of said input shaft; a first idler gear rotatably mounted on said idler shaft to engage said first two-toothed gear and said first $n$-toothed gear; a second idler gear rotatably mounted on said idler shaft to engage said second two-toothed gear and said second $n$-toothed gear; a pivot shaft connecting the other ends of said first and second arm supports parallel to the axis of said input shaft; a cam follower shaft; rocker means mounting said follower shaft on said pivot shaft to engage said follower shaft with the recesses on said cams; a first and second locking dog shafts affixed to said rocker means, said first dog shaft positioned to engage said fixed bearing plate to lock said support arms in position when one extreme is reached in the rotational range of the rotatably driven device and said first cam pivots said cam follower shaft in one direction on said rocker means to disengage the clutch and drive said cams and gears, said second dog shaft positioned to engage said fixed bearing plate to lock said support arms in position when the other extreme is reached and said first cam pivots said cam follower shaft in the other direction on said rocker means to disengage the clutch and drive said cams and gears; and means for spring loading said rocker means to center said rocker means, said cam follower shaft engaging the recesses on said cams when aligned, whereby the clutch is engaged and said input shaft is connected with said output shaft.

2. Apparatus in accordance with claim 1 wherein said spring loading means includes balanced spring loading means, comprising: a cross bar centrally pivoted on said second support arm; a first spring and a second spring connecting respective ends of said bar to corresponding pivot sides of said rocker means, whereby tension of said first spring is overcome when said rocker means is pivoted in one direction and tension of said second spring is overcome when said rocker means is pivoted in the other direction.

3. Apparatus in accordance with claim 1 including, in addition, a fixed wafer switch having a rotary wiper, said wiper connected to said output shaft, whereby said wiper is rotated according to the rotation of said output shaft.

4. Apparatus in accordance with claim 1 including, in addition, an indexed washer assembly, said assembly connecting said output shaft and a rotatably driven device having a mechanically limited operational range, and a fixed stop cooperating with said assembly whereby the operational range of the rotatably driven device is reduced according to the range of said washer assembly less than the driven device range.

5. Apparatus in accordance with claim 1 wherein said cam follower shaft is nylon, providing a semi-pliable cam engaging shaft.

6. Apparatus in accordance with claim 1 including as the rotatably driven device, a rotary potentiometer having a limited shaft rotation range, said potentiometer rotatably coupled to said output shaft.

References Cited in the file of this patent

UNITED STATES PATENTS

| 2,107,705 | Lang | Feb. 8, 1939 |
| 2,441,233 | Beers | May 11, 1948 |